(12) United States Patent
Bradley et al.

(10) Patent No.: US 9,042,615 B1
(45) Date of Patent: May 26, 2015

(54) NYSTAGMUS EVALUATION SYSTEM

(71) Applicants: Clay Bradley, Jackson, WY (US); Gage Austin Brasher, Austin, TX (US)

(72) Inventors: Clay Bradley, Jackson, WY (US); Gage Austin Brasher, Austin, TX (US)

(73) Assignee: BreathalEyes Inc., Dallas, TX (US)

( * ) Notice: Subject to any disclaimer, the term of this patent is extended or adjusted under 35 U.S.C. 154(b) by 108 days.

(21) Appl. No.: 13/965,862

(22) Filed: Aug. 13, 2013

Related U.S. Application Data

(63) Continuation of application No. 13/605,545, filed on Sep. 6, 2012, now abandoned.

(51) Int. Cl.
*G06K 9/00* (2006.01)
*G06T 7/00* (2006.01)

(52) U.S. Cl.
CPC .................................. *G06T 7/0014* (2013.01)

(58) Field of Classification Search
None
See application file for complete search history.

(56) References Cited

U.S. PATENT DOCUMENTS

2005/0110950 A1\* 5/2005 Thorpe et al. ................. 351/209
2008/0287821 A1\* 11/2008 Jung et al. ..................... 600/544

\* cited by examiner

*Primary Examiner* — Stephen R Koziol
*Assistant Examiner* — Amandeep Saini
(74) *Attorney, Agent, or Firm* — Stephen J. Stark

(57) ABSTRACT

Nystagmus conditions of a subject can be valuated by taking an image of at least a portion of the eye of the subject. The image is then converted into data related to relative lightness or darkness of portions of the image. Next the data is compared to at least baseline data if not data from multiple images of the subject to be able to report a physical condition of the subject, such as a blood alcohol level based on horizontal nystagmus conditions.

20 Claims, 1 Drawing Sheet

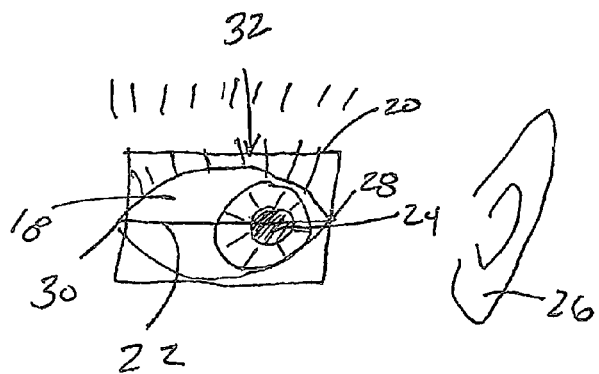
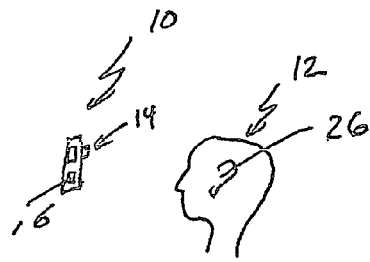
FIG 2
FIG 1
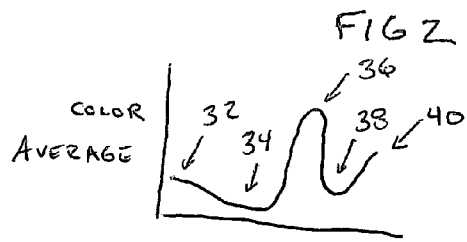
FIG 3
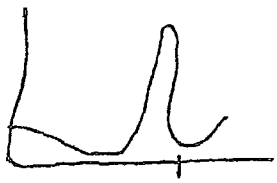
FIG 4
Row 4: 21 11111 12
Row 3: 32 1123 4543 1
Row 2: 32 1123 4543 1
Row 1: 21 11 11 11 11 2
AVG 2.5 1.5 1 1 1.5 2 2.5 3 2.5 2 1.5
        PUPIL
FIG 5

NYSTAGMUS EVALUATION SYSTEM

CLAIM OF PRIORITY

This application is a continuation of U.S. patent application Ser. No. 13/605,545 filed Sep. 6, 2012 which claims the benefit of U.S. Provisional Patent Application No. 61/531,298 filed Sep. 6, 2011 which is incorporated in its entirety by reference.

FIELD OF THE INVENTION

The present invention relates to a system and method for evaluating conditions of nystagmus, and more particularly for some embodiments to evaluating horizontal nystagmus conditions relative to a subject's blood alcohol content level.

BACKGROUND OF THE INVENTION

A number of efforts have been made to evaluate nystagmus conditions. U.S. Published Patent Application No. 2010/0016754 provides a camera to track eye movement as well as a display to attempt to have a subject attempt to follow a visual pattern with their eye. Eye movement can then be evaluated relative to a baseline movement to indicate whether there appears to be an abnormal movement of the eye and thus an impairment of the subject.

Patents such as U.S. Published Patent Application No. 2005//0110950 utilizes sophisticated schemes for identifying pupil movement and location based on an array positioning system apparently evaluated at extremely short intervals. Other have attempted to evaluate nystagmus utilizing various techniques such as by overlaying images and/or other techniques.

The applicant believes that there remains a need for an improved and/or cost effective way of evaluating nystagmus which can be implemented for either entertainment or for more technical uses such as for providing an estimated blood alcohol content, or identifying other medical conditions such as Parkinson's disease, Alzheimer's disease, Huntington's disease, fetal alcohol syndrome disorder, attention deficit hyperactive disorder, schizophrenia, autism, Tourette's Syndrome, progressive supranuclear palsy, alcohol or drug induced impairment, etc.

SUMMARY OF THE INVENTION

It is an object of the present invention to provide a testing system to evaluate certain conditions of an individual relative to nystagmus conditions.

It is another object of at least some embodiments of the present invention to provide an estimated blood alcohol content level based on nystagmus conditions evaluated by a processor.

Accordingly, in accordance with many embodiments of the present invention, a camera provides at least two images of at least a portion of an eye to a processor. Rather than overlaying images as has apparently been done in prior art, the applicant has developed what is believed to be a unique way of analyzing eye movement such as nystagmus conditions and then comparing eye movement based on reference data previously relative a subject with known blood alcohol content levels. Other conditions may be evaluated based on other baseline data.

The applicant discovered that extremely accurate estimations can predict a blood alcohol content of individuals utilizing horizontal nystagmus conditions. A camera such as a smart phone camera can image an eye of a particular patient in one or more positions such as looking towards their ear, following a guide, or other situation. The image obtained may be a cropped area of at least a portion of the eye. In the applicant's preferred embodiment, the colors are transformed into a scale of gray, and then saturated to attempt to minimize the impact of bad lighting.

The relative grayness, i.e., lightness or darkness of each pixel can be assigned a numerical value, such as with darker having a higher numerical value than lighter, or visa versa. A swathe of varying width can then be created based on averages of the numerical representations of the shading of each particular column (such as pixel by pixel) taken along the image. Those areas where the pupil is located result in a darker areas than the locations without pupil beside the pupil. Thus, empirically the horizontal position of the pupil can be detected. However, instead of comparing images to one another, the horizontal empirically derived swathe, or at least its underlying numerical considerations, can be compared to baseline or historical data to evaluate relative to movement trends of the eye to assist in identifying possible and/or probable nystagmus condition and simultaneously correlate to historical data to evaluate the percent blood alcohol content level.

Similar technology can be utilized to evaluate vertical nystagmus as well. Instead of evaluating columns of data, pixel or other rows could be evaluated for vertical positioning of the pupil. Then, particularly when combined with horizontal pupil position determination as described above, two-dimensional movement of the pupil could be evaluated for at least some embodiments. However, for blood alcohol content level, horizontal engaged nystagmus evaluation as described above has been found to function satisfactory to provide sufficient accuracy to within 0.02 blood alcohol percent for most individuals by the applicant in field tests.

BRIEF DESCRIPTION OF THE DRAWINGS

The particular features and advantages of the invention as well as other objects will become apparent from the following description taken in connection with the accompanying drawings in which:

FIG. 1 is a side plan view of the presently preferred embodiment of the present invention showing a smart phone proximate to a subject;

FIG. 2 shows a rear plan view of an image taken by the smart phone in relationship to an ear of the subject shown in FIG. 1;

FIG. 3 is a graphical representation of data taken from the image of FIG. 2 at a first instance;

FIG. 4 is a representation of data taken from an image similar to that shown in FIG. 3 at a second instance; and FIG. 5 is a simplified numerical example showing the creation of the data shown in FIG. 3 or 4.

DETAILED DESCRIPTION OF THE PREFERRED EMBODIMENT

FIG. 1 shows a presently preferred embodiment of the present invention in the form of a smart phone 10 proximate to a subject 12. Although a smart phone 10 is illustrated, other embodiments could be employed by providing a camera 14 connected to a processor 16 whether part of a unitary device, such as a smart phone 10 such as those commonly sold by Apple Corporation, Motorola, Samsung or others having various operating systems and capabilities, or provided as separate components such as camera images communicated to a processor 16 of possibly separate structures. Currently, many smart phones 10 can utilize applications which are made available online which can then be downloaded to a smart phone 10 for use by the subject 12 or by another with a subject 12. Thus providing the capabilities to a user of the smart phone 10 is believed to be a particularly attractive option, although other embodiments may perform differently.

FIG. 2 shows a user holding the smart phone 10 relative to the subject 12 to image an eye 18. The eye 18 maybe framed such as with a frame 20 appearing or otherwise displayed on the screen 22 of the smart phone 10 such as possibly the whole screen 22 or a smaller portion of the screen 22 so as to be able to locate the eye 18 thereto for use of computation and/or evaluation. Of course, some embodiments may not provide a frame 20 and the software may process and analyze the location of the eye independent of using a frame 20. A guide such as line 22 may further be provided such as to vertically align the pupil 24 or other portion of the eye 18.

When evaluating horizontal gauge nystagmus (HGN) for blood alcohol content according to the presently preferred embodiment of the present invention, the subject 12 preferably looks toward their ear 26 and then at least two images are captured over a period of time, such as less than about 10 seconds. More images, and/or shorter time periods, may be utilized in various embodiments. The frame 20 may contact corners 28,30 of the eye 18 for some embodiments. It may be that some users miss the eye 18 and algorithm can possibly assist in locating the eye 18 within the image taken. Preferably, the picture is cropped so that much of the data is removed external to the corners 28,30 of the eye 18 by the processor 16 whether internal to the smart phone 10 device or other device external thereto such as if a camera 14 is a separate component relative to processor 16 as it relates to the present invention.

The data represented by the image 32 can then be transformed into scales or shades of gray for at least the preferred embodiment. Other embodiments may maintain them as colors. Saturation can then occur of the shades of gray for at least some embodiments to decrease the impact of bad lighting. Each of pixels are assigned a numerical value based on their relative shade of grey (or lightness/darkness). Vertical columns of pixels can then be summed and averaged to provide a numerical figure for each column of the average along each column. A swath can then be created such as shown in FIGS. 3A and 3B representing the average numerical value of the vertical pixels as averaged by number. For example purposes, FIG. 4 shows a four row high frame. It will be understood by those of ordinary skill in the art that this is by way of example and many more pixels than four will likely be provided in any given column for actual embodiments. Furthermore some columns in various embodiments may be evaluated on a mutipixel width.

If a one (1) is light and a ten (10) is dark, a hexadecimal (or decimal) or any other numerical value can be assigned to each pixel can be assigned based on relative darkness (or conversely lightness). A representative numerical average of a specific shading of pixels relative to each of the columns of the frame 20 could then be provided as shown. The average could then be computed as shown in FIG. 4. The graphs of FIGS. 3A and 3B represent on the vertical scale these averages (for successive images) of data similar to that obtained in FIG. 4 with respect to eye positions as taken in FIG. 1. In these examples, the pupil is located as shown by way of simplified example. The horizontal location of the pupil can then be compared to other figures such as FIG. 3 where it is seen moving from right to left which could thus indicate an addition of nystagmus. Although decimal numbers are utilized for convenience of example, hexadecimal values may be attributed to different colors in software for software convenience.

Although black and white is relative to do with color shades, other colors can be evaluated, particularly hexadecimals such as by various color assignments such as that provided HCP: www.threeschools.com/hml-hml colornames.asp. Hexadecimal values such as shown 000000 to FFFFFF could be assigned for particular shadings of colors or grayness shown lighter to darker or darker to lighter, etc. As can be seen from representations, even as done by the averages, there is a darker area 32 followed by lighter area 34 followed by darker area 36 followed by a lighter area 38 and then a darker area 40 which, from left to right, can eventually assist in identifying the center or middle dark area 36 which can correspond to a pupil. This provides a simple and elegant way to construct pupil recognition on a horizontal basis which has been shown to be simplified relative to overlaying image analysis and its potential complexities.

Just like horizontal gaze nystagmus can be evaluated with this technique, the process can also evaluate columns of a similar basis to provide a vertical gauge nystagmus and then even the two sets of data could be correlated for motion evaluation in two dimensions.

One advantage of the applicant's technology is that it provides simple processing steps and readily available equipment to evaluate the nystagmus condition.

Once the movement of the pupil is ascertained, if any is detected, it can be compared to movement data associated with intoxicated individuals, or non-intoxicated individuals, of various blood alcohol content levels or other baseline of a given condition and/or circumstances. The processor 16 can provide output such as could be provided on the screen 22 to identify a specific blood alcohol content levels reflecting that of the subject 12 for either entertainment purposes or for use by law enforcement personnel, hospital or other medical personnel or others. Hospitals and doctor's offices could verify whether a patient has "sobered up" from anesthesia, etc. with such technology.

Furthermore, in addition to providing blood alcohol content and identifying an inebriated state whether from alcohol, drugs or other use, various medical conditions such as Parkinson's disease, Alzheimer's disease, Huntington's disease, fetal alcohol syndrome disorder, attention deficit hyperactive disorder, schizophrenia, autism, Tourette's Syndrome, progressive supranuclear palsy, and/or other conditions might be identified or prescreened utilizing this technology. Accordingly, a doctor on a mission trip with a cell phone could potentially evaluate various medical conditions rather quickly and easily, possibly without a need for expensive equipment to accompany the trip.

Preferred embodiments provide the method of framing the eye 18 within frame 20 usually require the subject look toward their ear 26 for at least a determined period of time such as less than 10 seconds and possibly capturing two, three, or maybe five or more images, analyzing the pixels of the image for color, converting those colors to a numeral representation, possibly after converting to gray and/or saturating decrease effects of bad lighting, detecting the pupil center position, possibly detecting the iris and the pupil and the rest of the cornea by averaging the histogram from the left corner 30 to right corner 28 of the eye 18 on a column by column basis as it relates from lightness to darkness and then averaging that the columns pixels relative lightness or darkness. These columns provide a histogram or swathe. This has been found to identify the location of the pupil 36 such as shown in FIGS. 3A and 3B and described above.

With the pupil position understood, most times it can be compared over time and/or successive frames to detect eye movement to evaluate potential nystagmus conditions compared to reference data based on known alcohol percentages or other baseline data for various conditions. Then an output of an estimated and/or evaluated blood alcohol content or other condition can be provided on the screen 22 or through other output to the user and/or subject 12 for entertainment, medical use or other use. For instance, the screen 22 may display: Your Blood Alcohol content is 0.12, etc.

While the preferred embodiment is disclosed herein, other embodiments for may test for vertical nystagmus as well by turning the evaluation analysis 90 degrees averaging values on horizontal rows, vertical pupil position could be evaluated in a similar manner as the horizontal positioning is ascertained above. Further both horizontal and vertical positions could be analyzed together for still other embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method for analyzing and reporting nystagmus conditions of a subject comprising the steps of:
   a) a camera provides at least one image of at least a portion of an eye of a subject to a processor;
   b) the processor assigning a numerical value to each pixel related to a relative darkness of the pixel to provide data for the image;
   c) comparing the data to a baseline data to determine a nystagmus condition; and then
   d) the processor at least assisting in automatedly reporting a physical condition of the person related to the nystagmus condition.

2. The method of claim 1 wherein the step of providing the image is performed by the camera of a smart phone with the processor being internal to the smart phone.

3. The method of claim 1 wherein the at least one image is taken with the eye looking toward the ear of the subject.

4. The method of claim 3 wherein the at least one image is captured using a guide for aligning the eye when taking the image.

5. The method of claim 4 wherein the nystagmus condition analyzed is horizontal nystagmus and the physical condition reported is related to one of a blood alcohol content, unauthorized drug use, Parkinson's disease, Alzheimer's disease, Huntington's disease, fetal alcohol syndrome disorder, attention hyperactive disorder, schizophrenia, autism, Tourette's syndrome, and progressive supranuclear palsy.

6. The method of claim 1 wherein the processor transforms the image into a scale of gray as a gray image before assigning the numerical values to each pixel.

7. The method of claim 6 wherein the gray image is saturated before assigning the numerical values to each pixel.

8. The method of claim 1 further comprising the step of providing a frame viewable by the camera locating the at least a portion of the eye when taking the image.

9. The method of claim 8 wherein the eye is positioned to appear to be contacted at corners of the eye by the frame.

10. The method of claim 1 further comprising the step of providing a guide viewable by the camera which at least assists in locating the at least a portion of the eye when taking the image.

11. The method of claim 1 further comprising the step of taking at least two images, providing data for each image, and comparing the images to assist in determining the nystagmus condition.

12. The method of claim 11 wherein the two images are taken in succession.

13. The method of claim 11 wherein the at least two images are taken within 10 seconds.

14. The method of claim 1 wherein the data is sorted related to columns of pixels and averaged as a column average and the column average is compared to the baseline data to determine the nystagmus condition.

15. The method of claim 1 wherein a location of a pupil of the eye is evaluated based on the numerical values evaluated by the processor.

16. The method of claim 1 wherein the data is evaluated for horizontal nystagmus, the physical condition is a relative blood alcohol content, and the baseline data has data related to known blood alcohol levels.

17. The method of claim 16 wherein the reported physical condition is blood alcohol content.

18. A method for analyzing and reporting nystagmus conditions of a subject comprising the steps of:
   a) providing at least one image of at least a portion of an eye of a subject to a processor;
   b) the processor assigning a numerical value to each column related to a relative darkness of at least one pixel in the column to provide data for the image;
   c) comparing the data to a baseline data to determine a nystagmus condition; and then
   d) the processor at least assisting in automatedly reporting a physical condition of the person related to the nystagmus condition.

19. The method of claim 18 wherein the data is evaluated for horizontal nystagmus, the physical condition is a relative blood alcohol content, and the baseline data has data related to known blood alcohol levels.

20. The method of claim 18 wherein the nystagmus condition analyzed is horizontal nystagmus and the physical condition reported is related to one of a blood alcohol content, unauthorized drug use, Parkinson's disease, Alzheimer's disease, Huntington's disease, fetal alcohol syndrome disorder, attention hyperactive disorder, schizophrenia, autism, Tourette's syndrome, and progressive supranuclear palsy.

* * * * *